(12) United States Patent
Lamppa

(10) Patent No.: US 10,823,424 B2
(45) Date of Patent: Nov. 3, 2020

(54) WOOD BURNING STOVE ASSEMBLY

(71) Applicant: Daryl Lamppa, Tower, MN (US)

(72) Inventor: Daryl Lamppa, Tower, MN (US)

(*) Notice: Subject to any disclaimer, the term of this patent is extended or adjusted under 35 U.S.C. 154(b) by 104 days.

(21) Appl. No.: 16/281,153

(22) Filed: Feb. 21, 2019

(65) Prior Publication Data
US 2020/0271324 A1 Aug. 27, 2020

(51) Int. Cl.
| F24B 1/19 | (2006.01) |
| F24B 1/195 | (2006.01) |
| F24B 1/188 | (2006.01) |
| F24B 1/192 | (2006.01) |

(52) U.S. Cl.
CPC ............ *F24B 1/195* (2013.01); *F24B 1/1885* (2013.01); *F24B 1/19* (2013.01); *F24B 1/192* (2013.01)

(58) Field of Classification Search
CPC .. F23L 9/02; F24B 5/025; F24B 5/026; F24B 1/195; F24B 5/028
See application file for complete search history.

(56) References Cited

U.S. PATENT DOCUMENTS

| 2,345,519 | A | 3/1944 | Wingert |
| 4,111,181 | A | 9/1978 | Canney |
| 4,117,824 | A | 10/1978 | McIntire |
| 4,141,336 | A | 2/1979 | Fitch |
| 4,184,473 | A | 1/1980 | McIntire |
| 4,200,086 | A | 4/1980 | Kolb |
| 4,207,860 | A | 6/1980 | Schrock |
| 4,232,650 | A | 11/1980 | Frank |
| 4,265,213 | A | 5/1981 | Gorsuch |
| 4,392,477 | A | 7/1983 | Milligan |
| 4,832,000 | A | 5/1989 | Lamppa |
| 4,854,298 | A | 8/1989 | Craver |
| 5,413,089 | A | 5/1995 | Andors |
| 5,522,327 | A | 6/1996 | Buckner |
| 5,647,341 | A * | 7/1997 | Langman ............... F24B 1/1808 126/512 |
| 5,669,373 | A | 9/1997 | Gulddal |
| 5,996,575 | A * | 12/1999 | Shimek .................... F23M 5/00 126/500 |
| 6,595,199 | B1 | 7/2003 | Andersen |

(Continued)

FOREIGN PATENT DOCUMENTS

| CN | 2444124 | 8/2001 |
| DE | 202011000775 | 7/2011 |

(Continued)

*Primary Examiner* — Jason Lau

(57) ABSTRACT

A high efficiency wood burning furnace assembly includes an internal firebox having a door positioned therein to access an interior of the internal firebox. An exhaust throat extends through an upper wall and a grate is mounted in the internal firebox and is spaced vertically above a lower wall. A primary diffuser is mounted within the internal firebox and is positioned adjacent the front wall and the grate. A primary air supply is in fluid communication with the primary diffuser to supply air to the primary diffuser such that the air is released along an upper surface of the grate. An air conduit is mounted in the internal firebox and extends upwardly from the primary diffuser. The air conduit releases air vertically above the grate and the primary diffuser. A front wall of the internal firebox has inlets extending therethrough that are fluidly coupled to the air conduit.

1 Claim, 9 Drawing Sheets

(56) References Cited

U.S. PATENT DOCUMENTS 6,817,354 B2 11/2004 Laitinen
2016/0363324 A1* 12/2016 Barry .................. F24B 5/025

FOREIGN PATENT DOCUMENTS

| EP | 648976 | | 10/1994 | |
|----|--------|----|--------|-----|
| EP | 3199872 | A1 * | 8/2017 | .............. F24B 1/195 |
| GB | 2436869 | | 10/2007 | |
| JP | 2004225657 | A * | 8/2004 | |

* cited by examiner

WOOD BURNING STOVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wood burning furnace devices and more particularly pertains to a new wood burning furnace device for increasing the efficiency of burning wood by decreasing the amount airborne pollutants dispersed during the combustion process and by retaining a greater level of heat to be dispersed within a dwelling. More particularly, the disclosure teaches a device which maintains a proper temperature to facilitate the combustion of gases and liquids released during the burning of fuel therein.

BRIEF SUMMARY OF THE INVENTION

An embodiment of the disclosure meets the needs presented above by generally comprising an internal firebox including an upper wall, a lower wall and a perimeter wall attached to and extending between the upper and lower walls. The perimeter wall includes a front wall and a door is positioned in the front wall to access an interior of the internal firebox. An exhaust throat extends through the upper wall. A grate is mounted in the internal firebox and is spaced vertically above the lower wall. A primary diffuser is mounted within the internal firebox and is positioned adjacent the front wall and the grate. A primary air supply is in fluid communication with the primary diffuser to supply air to the primary diffuser such that the air is released along an upper surface of the grate. An air conduit is mounted in the internal firebox and extends upwardly from the primary diffuser. The air conduit releases air vertically above the grate and the primary diffuser. The front wall has inlets extending therethrough that are fluidly coupled to the air conduit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
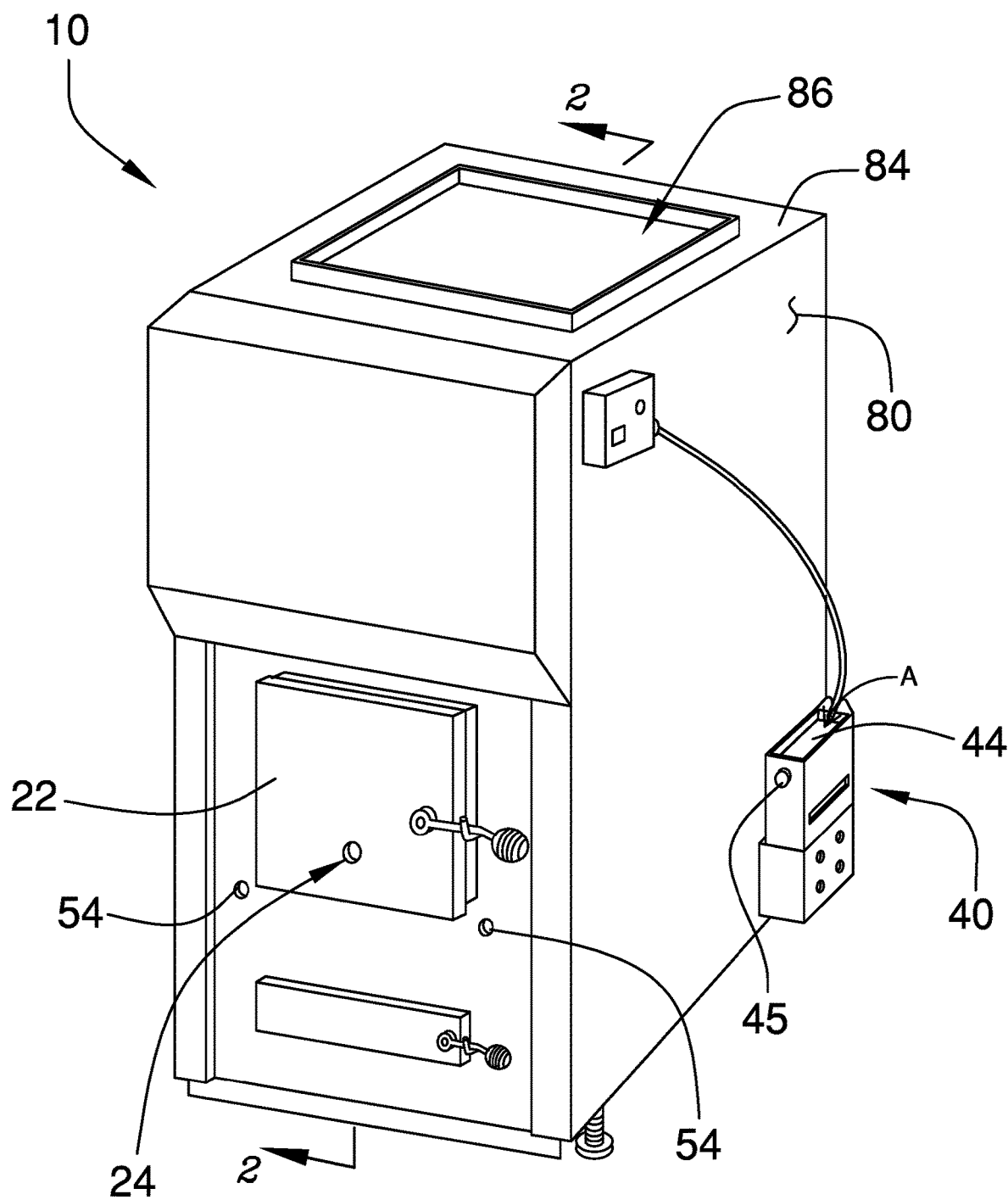
FIG. 1 is a front isometric view of a high efficiency wood burning furnace assembly according to an embodiment of the disclosure.

With reference now to the drawings, and in particular to FIGS. 1-11 thereof, a new wood burning furnace device embodying the principles and concepts of an embodiment of the disclosure and generally designated by the reference numeral 11 will be described.

As best illustrated in FIGS. 1 through 11, the high efficiency wood burning furnace assembly 10 generally comprises a device which can be used for burning wood to produce heat. As such, it should be understood that while the assembly 10 is provided with the title of a furnace, the same may also be adapted as a stove which could be used for cooking purposes or as an exposed stove used for heating a room. The assembly 10 includes a generally conventional internal firebox 12 having an upper wall 14, a lower wall 16 and a perimeter wall 18 that is attached to and extends between the upper 14 and lower 16 walls. The perimeter wall 18 includes a front wall 20 and a door 22 is positioned in the front wall 20 to access an interior of the internal firebox 12. The door 22 has a vent hole 24 extending therethrough to vent air "C" into the internal firebox 12 and which may terminate in an interior slot 26, which is laterally elongated, positioned on the inside of the door 22. Air "C" is vertically spaced from the grate 30 so that it can interact with exhaust vapors as further described below. An exhaust throat 28 extends through the upper wall 14 and may further extend downwardly from the upper wall 14. The internal firebox 12 is typically lined with heat reflective materials such as bricks, conventionally used in wood burning furnaces for example, and will also include insulation, such as ceramic insulation, where heat transfer is not desirable.

Figure 6:
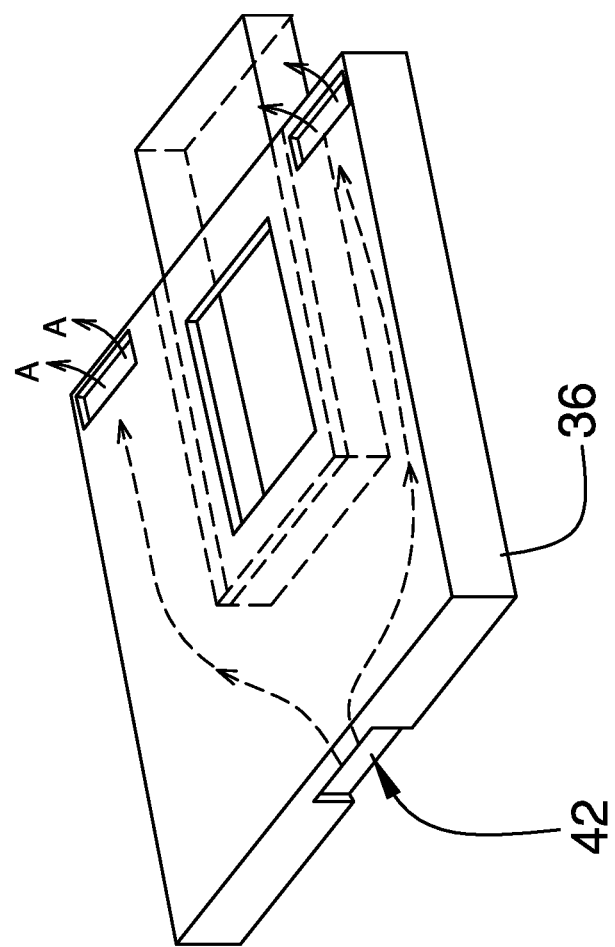
FIG. 6 is a top isometric view of an embodiment an ash catch and pre-air warming housing of the disclosure.

A grate 30 is mounted in the internal firebox 12 and is spaced vertically above the lower wall 16. An ash space 32 is defined between the grate 30 and the lower wall 16 and an ash catch 34 is positioned in the ash space 32 and is removable through the front wall 20. The ash space 32 may be bounded by a wall that is sized to properly fit the ash catch within the ash space 32. As can be seen in FIG. 6, for example, the ash catch 34 and ash space 32 are spaced from lateral sides of the assembly to allow for air "A" to move there-around and into a primary diffuser 38 that is mounted within the internal firebox 12. The primary diffuser 38 is positioned adjacent the front wall 20 and the grate 30. As can readily be understood from FIGS. 2 and 5, air "A" moves through a bottom compartment which acts as a pre-heat air box 36 for heating air "A" before it moves outwardly through vertical and laterally positioned apertures in the primary diffuser 38 over the grate 30.

A primary air supply 40 is in fluid communication with the primary diffuser 38 to supply air to the primary diffuser 38 such that the air is released along an upper surface of the grate 30. The primary air supply 40 includes a primary inlet 42 extending into the pre-heat air box 36 of the internal firebox 12 that is in fluid communication with the primary diffuser 38. A damper 44 is in fluid communication with the primary inlet 42. The damper 44 is actuatable at least between a closed condition and an open condition, though multiple positions may be provided. The damper 44 may be actuated in any conventional manner by a damper drive 45 to allow stepping of the actuator between multiple positions. The damper 44 will typically be mounted exteriorly of the internal firebox 12.

Figure 7:
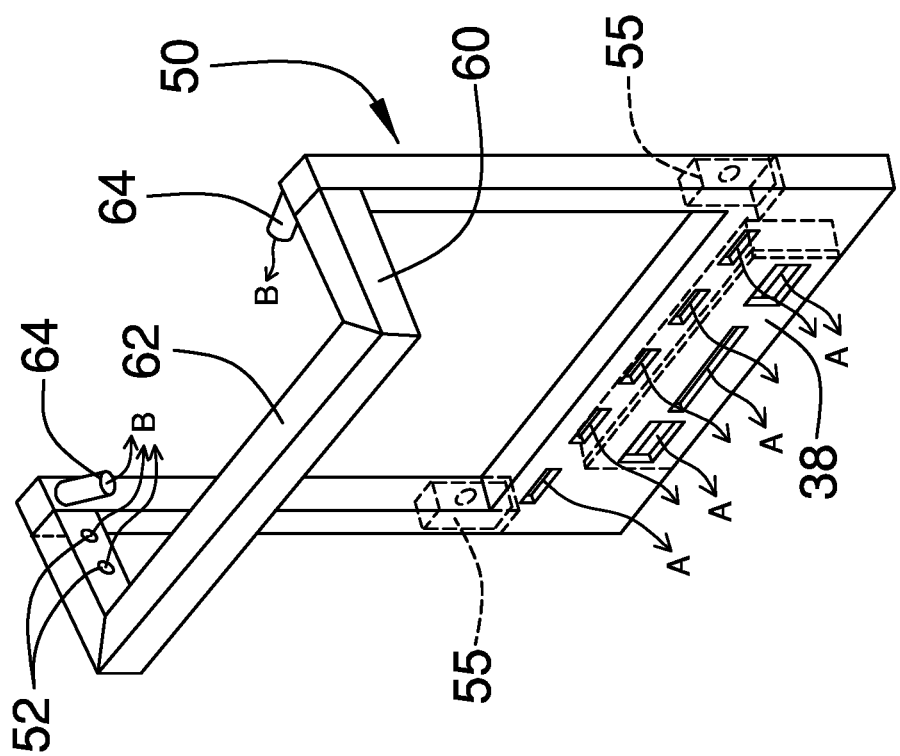
FIG. 7 is a rear isometric view of an embodiment of an air conduit of the disclosure.
Figure 8:
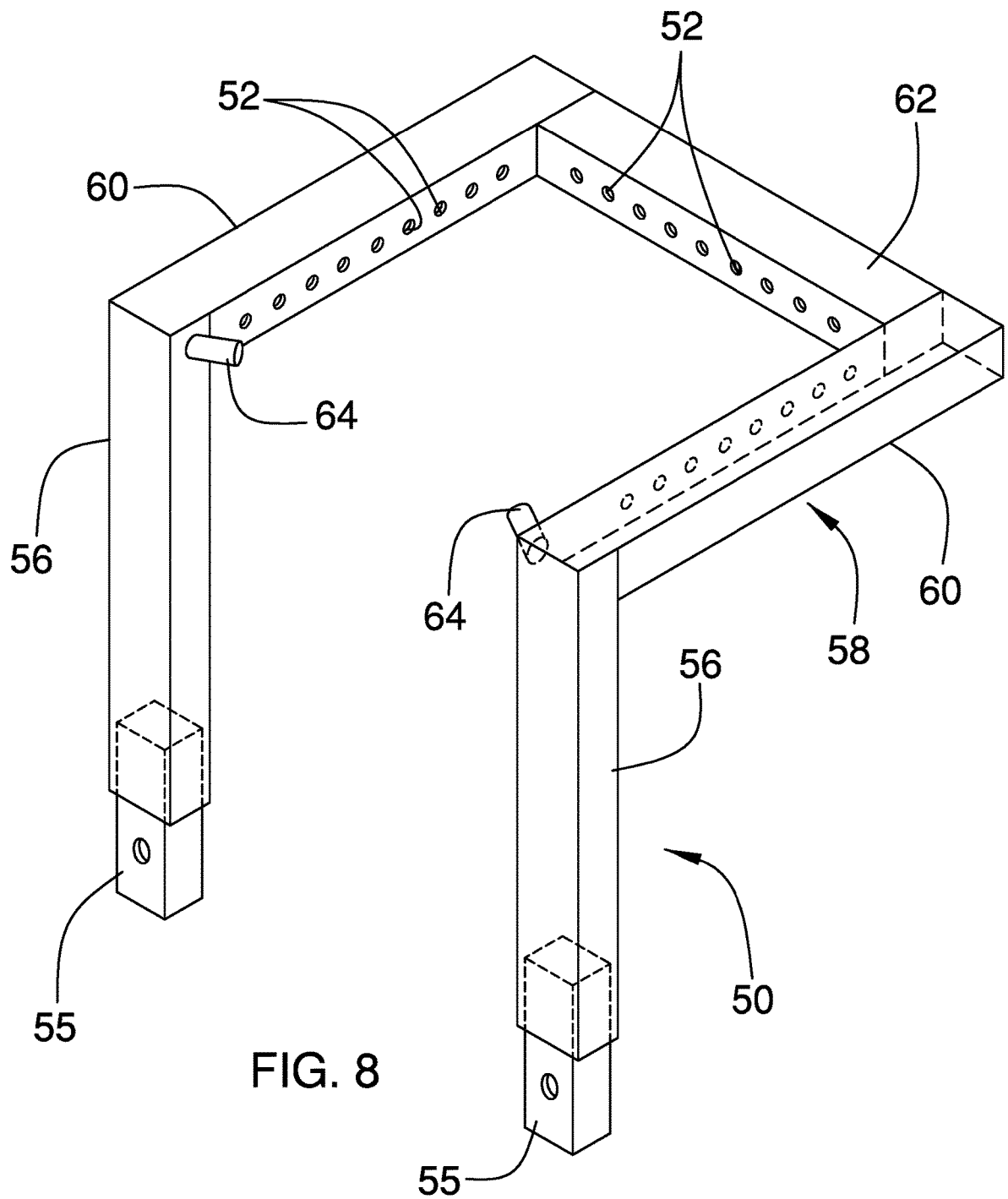
FIG. 8 is a front isometric view of an embodiment of an air conduit of the disclosure.
Figure 10:
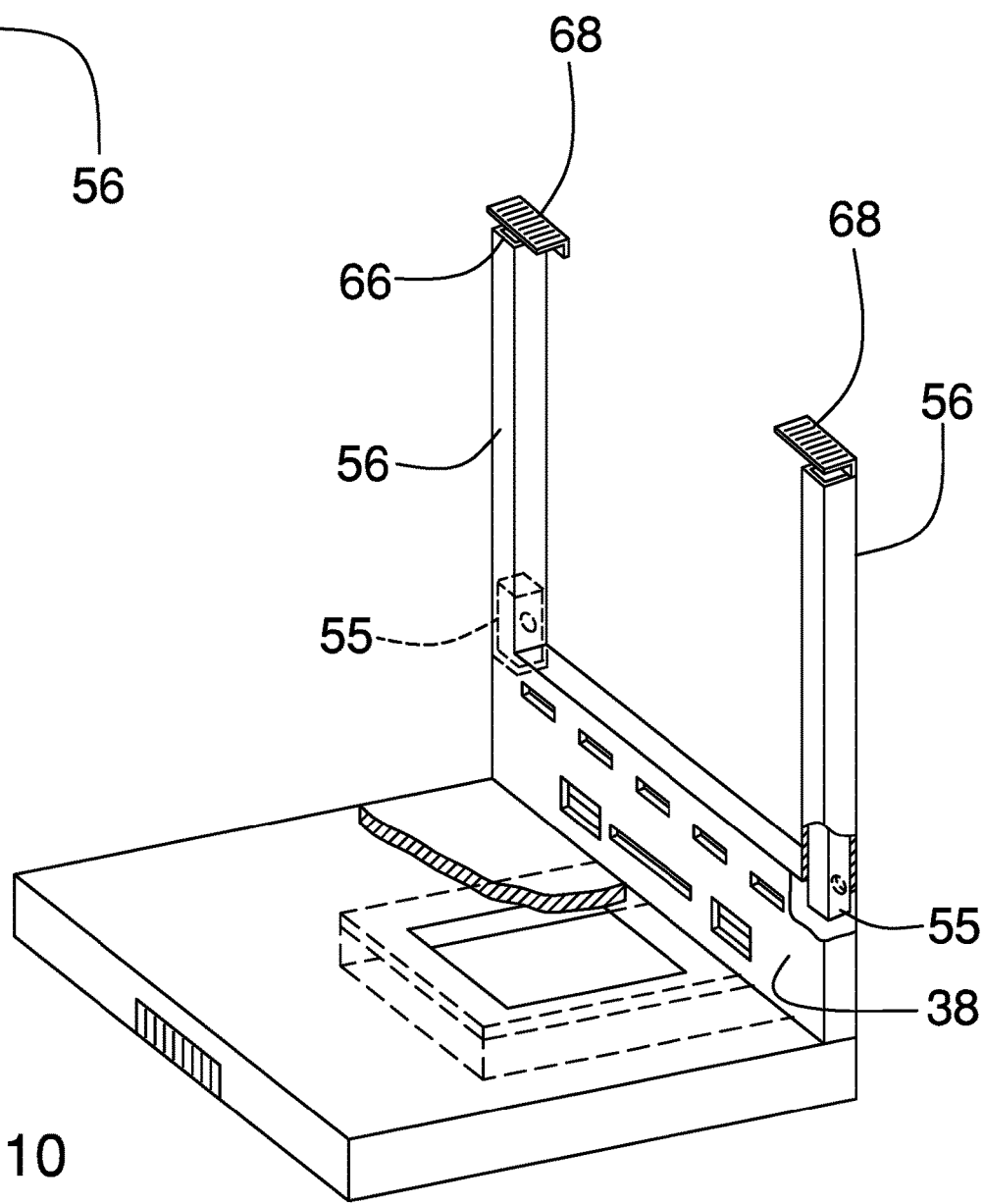
FIG. 10 is a rear isometric view of an embodiment of the air conduit of FIG. 9 of the disclosure.
Figure 11:
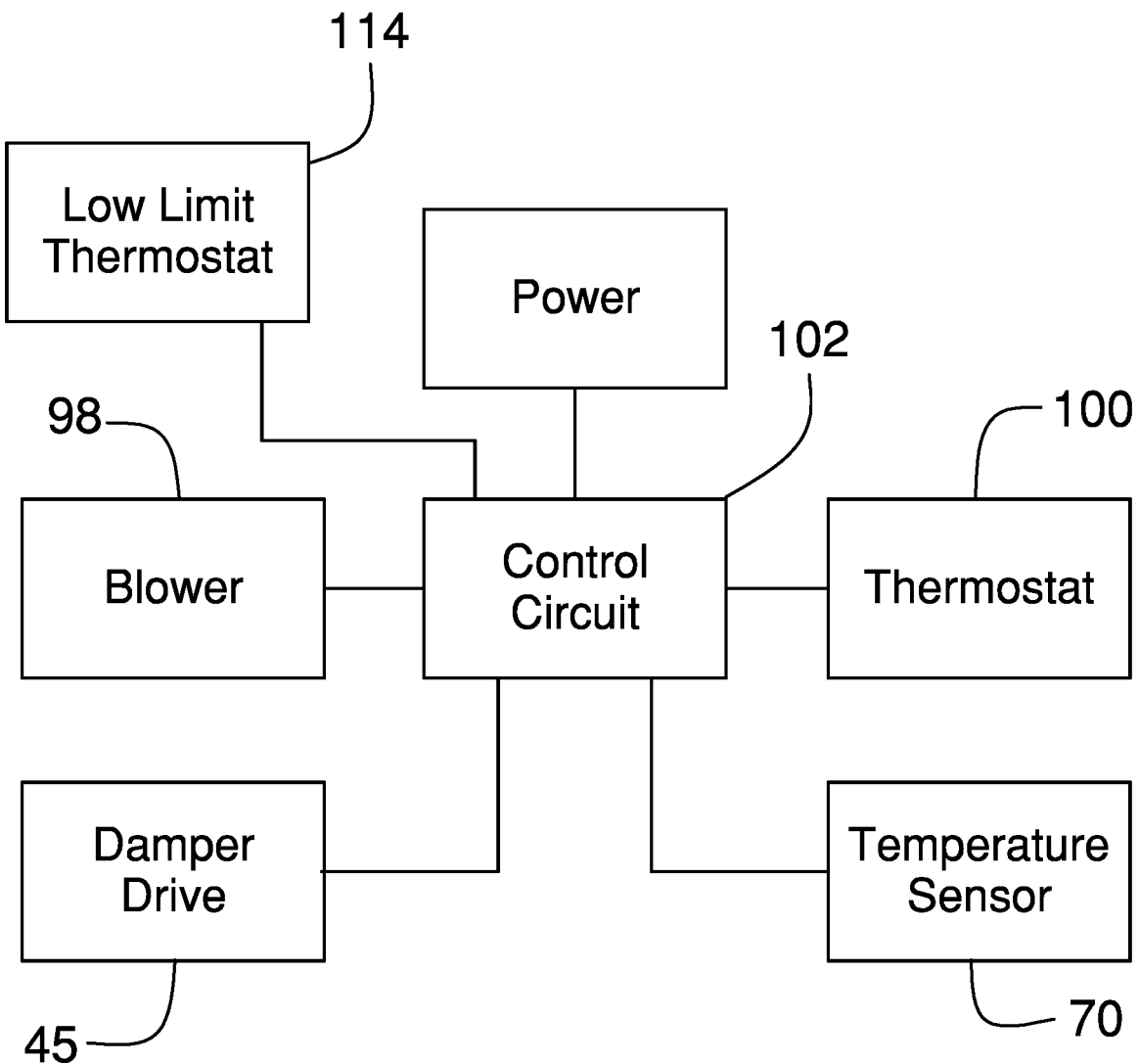
FIG. 11 is an example schematic view of an embodiment of the disclosure.

An air conduit 50 is mounted in the internal firebox 12 and extends upwardly from the primary diffuser 38. In one embodiment, the air conduit 50 releases air "B" vertically above the grate 30 and the primary diffuser 38. The air conduit 50 has a plurality of air openings 52 extending therethrough to vent air "B" into the internal firebox 12 above the primary diffuser 38 and the grate 30. The front wall 20 includes inlets 54 extending therethrough that may be fluidly coupled to the air conduit 50 by way of receivers 55. The receivers 55 may form tubes attached to and extending upwardly from the primary diffuser 38 and which are in fluid communication with the inlets 54. The air conduit 50 includes a pair of risers 56 spaced from each other. Each of the risers 56 is in fluid communication with one of the inlets 54 wherein the receivers 55 extend into the risers 56 as shown in FIG. 10. A transverse member 58 extends between the risers 56. The transverse member 58 includes a pair of arms 60 and a medial section 62. As can be seen in FIGS. 7 and 8, the arms 60 may be provided in different lengths. Each of the arms 60 is attached to one of the risers 56. The arms 60 each extend away from the front wall 20 and the medial section 62 extends between the arms 60 distal to the risers 56. The medial section 62 and arms 60 are positioned over the grate. The air openings 52 are positioned in the arms 60 and the medial section 62, wherein the air openings 52 in each of the arms 60 is directed toward another of the arms 60 while the air openings 52 in the medial section 62 is directed toward the front wall 20. A pair of angled ports 64 may further be provided and each is fluidly coupled to one of the arms 60 such that each of the risers 56 has one of the ports 64 positioned adjacent thereto. The angled ports 64 each have an open distal end directed inwardly toward each other and rearwardly of the front wall 20.

Figure 2:
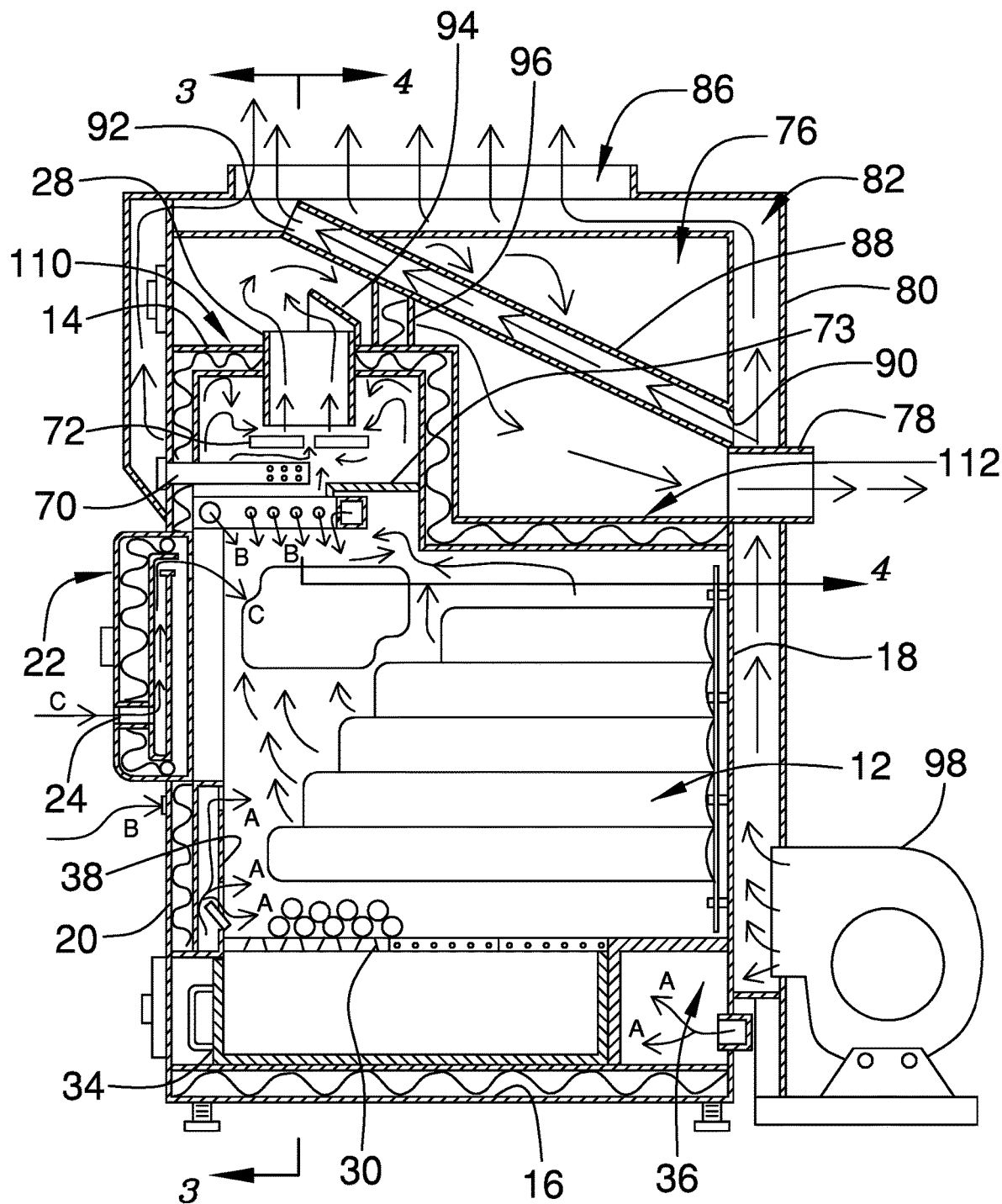
FIG. 2 is a cross-sectional view of an embodiment of the disclosure taken along line 2-2 of FIG. 1.
Figure 9:
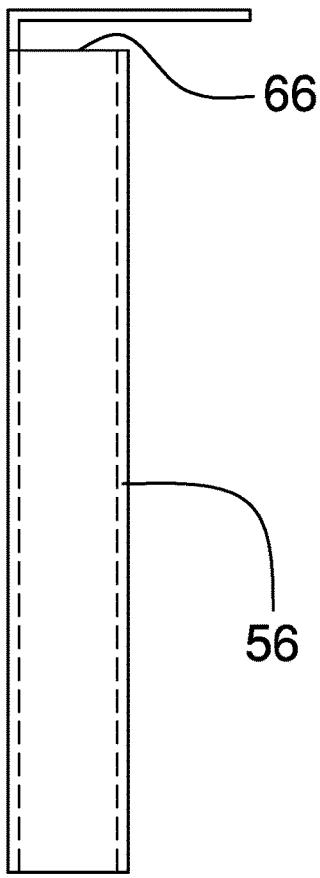
FIG. 9 is a side view of an embodiment of an air conduit of the disclosure.

FIGS. 9 and 10 depict a second embodiment of the air conduit 50 wherein no arms 60 or medial section 62 are provided. The risers 56 each terminate with open upper ends 66 and air deflectors 68 may be provided atop the risers 56 to deflect the air inward of the internal firebox 12 away from the front wall 20 and over the grate 30. As can be seen in FIG. 2, primarily, the air conduit 50 provides air "B" which interacts with the exhaust vapors as they rise up from the combustible material placed on the grate 30. Air "B" encourages complete combustion of any combustible material found within the exhaust vapor.

A plate 73 is positioned within the internal firebox 12 and is used to deflect airflow toward the air conduit 50 to cause exhaust vapors to travel between the arms 60 and then upwardly above the air conduit 50. The plate extends laterally across the internal firebox 12 to retain the exhaust vapors within the internal firebox 12 at a point where air "B" will combust any fluids or particulate within the exhaust vapors.

A temperature sensor 70 is mounted in the internal firebox 12 and is positioned above the air conduit 50. The temperature sensor 70 is in communication with the primary air supply 40 to adjust the air supplied to the primary diffuser 38. This ensures that the air temperature is within a set range to cause the highest combustion level possible of the gases and liquids within exhaust vapors. A baffle 72 is mounted in the internal firebox 12 and is positioned above the temperature sensor 70. The baffle 72 has a centrally located opening 74 extending therethrough for allowing air to travel around the temperature sensor 70, through the centrally located opening 74 and outwardly through the exhaust throat 28. Essentially, the baffle 72 forces the exhaust vapors to come into contact with the temperature sensor 70 so that accurate readings are obtained before the exhaust vapors leave the internal firebox 12.

The internal firebox 12 further includes an upper compartment 76 positioned over and in fluid communication with the exhaust throat 28. An exhaust port 78 is in fluid communication with the upper compartment 76. Generally, the exhaust port 78 is positioned below a horizontal plane intersecting an apex of the exhaust throat 28 such that exhaust vapors travel downwardly from the exhaust throat 28 to exit the upper compartment 76 through exhaust port 78. This causes the exhaust vapors to remain within the upper compartment 76 for a longer period of time, heating its walls and enhancing the upper compartment's 76 function as a heat exchanger.

Figure 3:
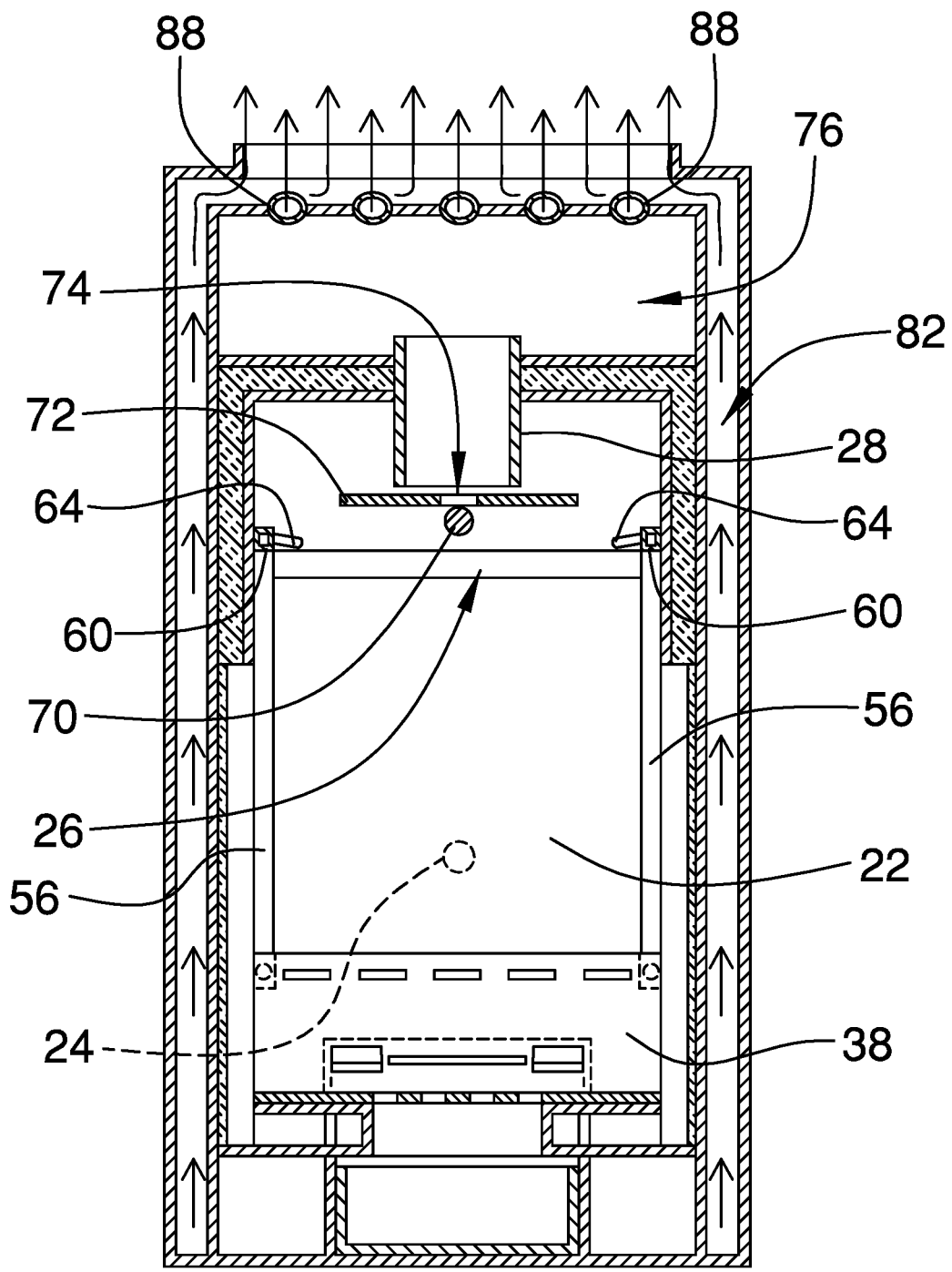
FIG. 3 is a cross-sectional view of an embodiment of the disclosure taken along line 3-3 of FIG. 2.
Figure 4:
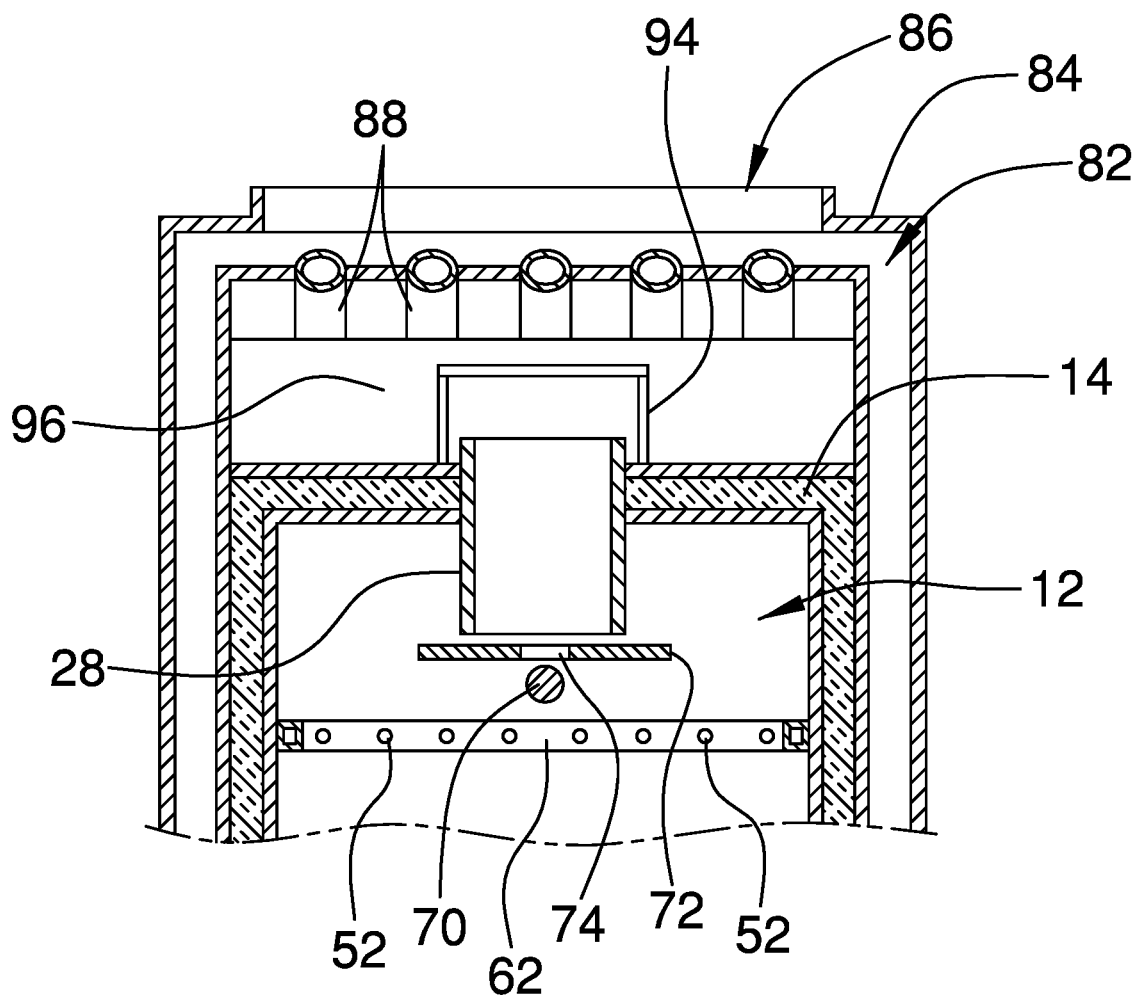
FIG. 4 is a cross-sectional view of an embodiment of the disclosure taken along line 4-4 of FIG. 2.
Figure 5:
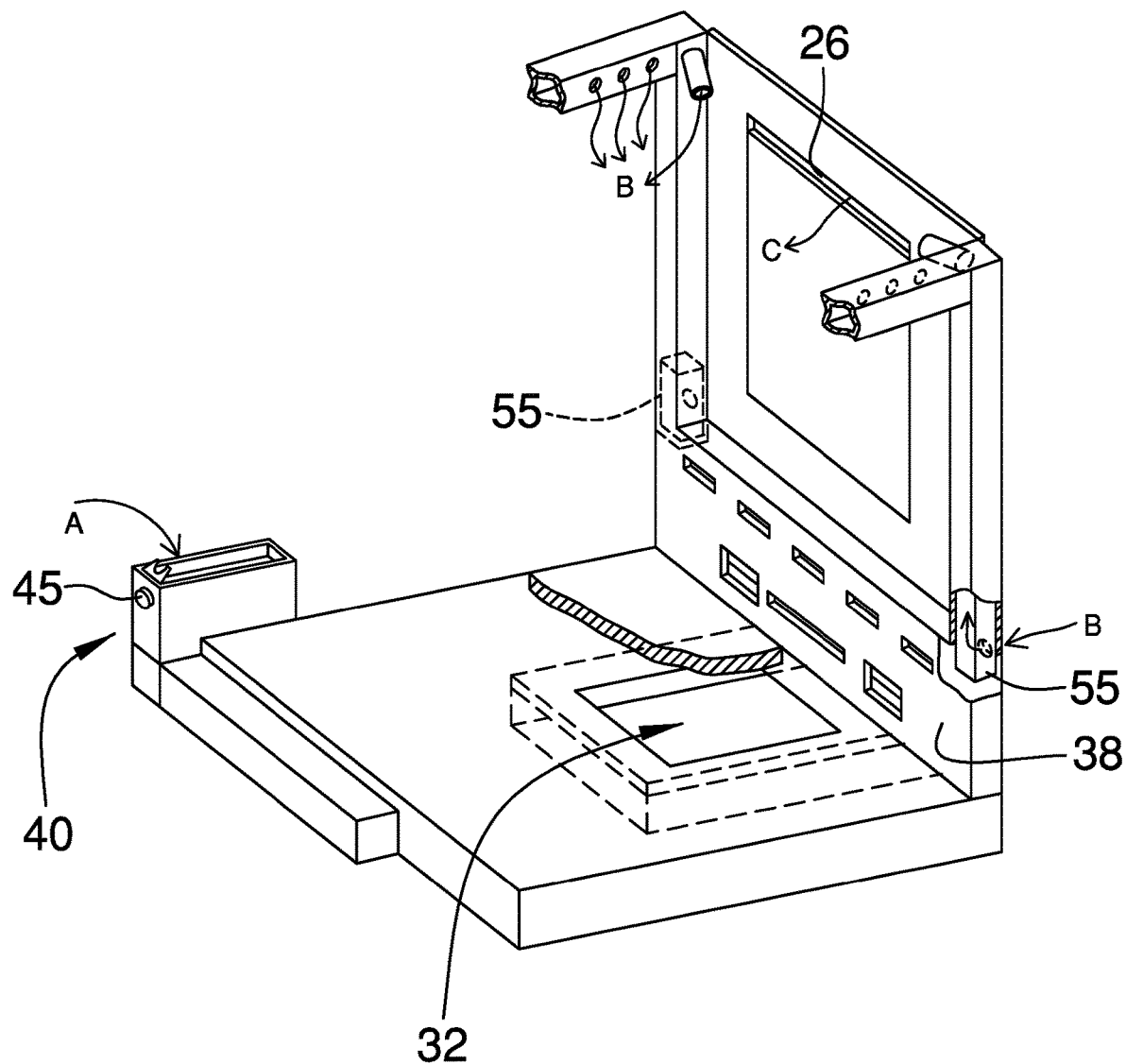
FIG. 5 is a broken rear isometric view of an embodiment of an air conduit of the disclosure.

An outer housing 80, or outside perimeter which forms a main furnace body, is mounted on the internal firebox 12 and forms an air heating space 82 between the outer housing 80 and the internal firebox 12 and upper compartment 76 wherein the air heating space 82 is in thermal communication with the internal firebox 12 and the upper compartment 76. The outer housing 80 has a top wall 84 having a hot air vent 86 extending therethrough for releasing heated air from the air heating space 82. The air heating space 82 extends at least upwardly along a back side of the internal firebox 12 and over the upper compartment 76 and may further extend around the sides of the internal firebox 12 as can be seen in FIGS. 3 and 4. Thus, a large surface area of the internal firebox 12 and upper compartment (heat exchanger) 76 are in thermal connectivity with the air heating space 82 to heat air therein to be vented upwardly through the hot air vent 86.

A plurality of heat exchange tubes 88 is provided and each has a first end 90 fluidly coupled to the air heating space 82 adjacent to the back side 18 and a second end 92 fluidly coupled to the air heating space 82 above the upper compartment 76. The heat exchange tubes 88 vent heated air upwardly to the hot air vent 86. Each of the heat exchange tubes 88 is angled upwardly and forwardly from the back side 18 adjacent to the outer housing 80 to the top wall 84 of the outer housing 80. As can be seen in the Figures, the heat exchange tubes 88 are orientated parallel to each other and are laterally spaced from each other. As the exhaust vapors from the internal firebox 12 enter the upper compartment 76, the exhaust vapors are forced between the heat exchange tubes 88 to increase contact between the heat exchange tubes 88 and the exhaust vapors. The upper compartment 76, as can be seen in FIG. 2, has a forward section 110 that is higher than a rearward section 112. The first ends 90 of the tubes are positioned below an apex of the forward section 110 and the exhaust port 78 is positioned adjacent to and below the first ends 90 so that the exhaust port 78 is adjacent to the rearward section 112 and between rearward section 112 and first ends 90. Thus, the exhaust vapors must travel below the first ends 90 and release a maximized amount of heat energy to the heat exchange tubes 88 before exiting through the exhaust port 78. The exhaust throat extends through the apex of the forward section 110 below the second ends 92 of the heat exchange tube 88.

To further facilitate the heat exchange, a hood 94 may be placed over the exhaust throat 28 to drive the exhaust vapors forward and away from the heat exchanger tubes 88 and the exhaust port 78. Also, a shield 96 may extend laterally across the upper compartment 76 and be positioned against and below the heat exchange tubes 88. As can be seen in FIGS. 2 and 4, the exhaust vapors must travel over the shield 96 to ensure their enhanced contact with heat exchange tubes 88 and walls of the upper compartment 76 before the exhaust vapors can escape the assembly 10 through the exhaust port 78.

A blower 98 is electrically coupled to a low limit thermostat 114 and is fluidly coupled to the air heating space 82 to force air through the air heating space 82 and outwardly through the hot air vent 86. The blower 98 will typically be positioned near a bottom, rear side of the outer housing 80. The blower 98 is electrically coupled to a programmed control circuit 102 which in turn is electrically or wirelessly in communication with a thermostat 100, the temperature sensor 70 and damper 44. The thermostat 100 may include one or more thermostats, such as remote controlled thermostats, wall mounted thermostats, override thermostats and the like. The blower 98 speed will increase or decrease depending on the thermostat 100 settings. More particularly, the control circuit 102 may modulate the damper open should the temperature sensor 70 detect too low of a temperature within the internal firebox 12 to adequately provide the amount of heat required by the thermostat 100 setting. The control circuit 102 will also modulate the damper 44 to maintain the preset clean burn settings.

In use, the assembly 10 is used in a like manner as are conventional furnaces or stoves while the air conduit 50 provides a much more efficient burning of the combustibles, such as wood, found within the internal firebox 12. The internal firebox 12 is filled with combustible material such as wood which is placed on the grate 30. Air "A" is warmed as it travels around the ash space 32 and then into the internal firebox 12 through the primary diffuser 38. This primary air "A" is used to start and combust the wood. The additional air "B" and "C" are not utilized for combustion of the wood, but instead facilitate further combustion of the gases and liquids found in the exhaust vapors which were the result of air "A" being used to first burn the wood. The addition of the baffle 72 further restricts air movement while ensuring that the temperature sensor 70 accurately measures the exhaust vapor. Finally, movement of exhaust vapor is additionally slowed by the plate 73, shield 96, and hood 94 to maximize combustion of all fluids and gases within the exhaust vapor and maximize heat transfer from the exhaust vapor to the vented air used for heating.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A low emissions wood burning furnace assembly comprising:

an internal firebox including an upper wall, a lower wall and a perimeter wall being attached to and extending between the upper and lower walls, the perimeter wall including a front wall, a door being positioned in the front wall to access an interior of the internal firebox, the door having a vent hole extending therethrough to vent air into the internal firebox, an exhaust throat extending through the upper wall, the exhaust throat extending downwardly from the upper wall;

a grate being mounted in the internal firebox and being spaced vertically above the lower wall, an ash space being defined between the grate and the lower wall, an ash catch being positioned in the ash space and being removable through the front wall;

a primary diffuser being mounted within the internal firebox and being positioned adjacent the front wall and the grate;

a primary air supply being in fluid communication with the primary diffuser to supply air to the primary diffuser such that the air is released along an upper surface of the grate, the primary air supply including:

a primary inlet extending into the internal firebox and being in fluid communication with the primary diffuser;

a damper being in fluid communication with the primary inlet, the damper being actuatable at least between a closed condition and an open condition, the damper being mounted exteriorly of the internal firebox;

an air conduit being mounted in the internal firebox and extending upwardly from the primary diffuser, the air conduit releasing air vertically above the grate and the primary diffuser, the air conduit having a plurality of air openings extending therethrough to vent air into the internal firebox above the primary diffuser and the grate, the front wall having inlets extending therethrough and being fluidly coupled to the air conduit, the air conduit including:

a pair of risers spaced from each other, each of the risers being in fluid communication with one of the inlets;

a transverse member extending between the risers, the transverse member including a pair of arms and a medial section, each of the arms being attached to one of the risers, the arms each extending away from the front wall, the medial section extending between the arms distal to the risers, the medial section being positioned over the grate, the air openings being positioned in the arms and the medial section, the air openings in each of the arms being directed toward another of the arms, the air openings in the medial section being directed toward the front wall;

a pair of angled ports each being fluidly coupled to one of the arms, each of the risers having one of the ports positioned adjacent thereto, each of the angled ports having an open distal end directed inwardly and rearwardly of the front wall;

a temperature sensor being mounted in the internal firebox and being positioned above the air conduit, the temperature sensor being in communication with the primary air supply to adjust the air supplied to the primary diffuser;

a baffle being mounted in the internal firebox and being positioned above the temperature sensor, the baffle having a centrally located opening extending therethrough for allowing air to travel around the temperature sensor, through the centrally located opening and outwardly through the exhaust throat;

the internal firebox further including an upper compartment positioned over and being in fluid communication with the exhaust throat, an exhaust port being in fluid communication with the upper compartment, the exhaust port being positioned below a horizontal plane intersecting an apex of the exhaust throat such that exhausted air travels downwardly from the exhaust throat to exit the upper compartment through exhaust port;

an outer housing being mounted on the internal firebox and forming an air heating space between the outer housing and the internal firebox wherein the air heating space is in thermal communication with the internal firebox, the outer housing having a top wall having a hot air vent extending therethrough for releasing heated air from the air heating space, the air heating space being extending at least upwardly along a back side of the outer housing and over the upper compartment;

a plurality of heat exchange tubes being provided and having a first end fluidly coupled to the air heating space adjacent to the back side and a second end fluidly coupled to the air heating space above the upper compartment, the heat exchange tubes venting heated air upwardly to the hot air vent, each of the heat exchange tubes being angled upwardly from the back side to the top wall, the heat exchange tubes being orientated parallel to each other and being laterally spaced from each other; and a blower being fluidly coupled to the air heating space to force air through the air heating space and outwardly through the hot air vent.

\* \* \* \* \*